Nov. 11, 1924.
C. W. LARNER
1,514,975
RATE OR FLOW CONTROLLER
Filed Nov. 28 1921
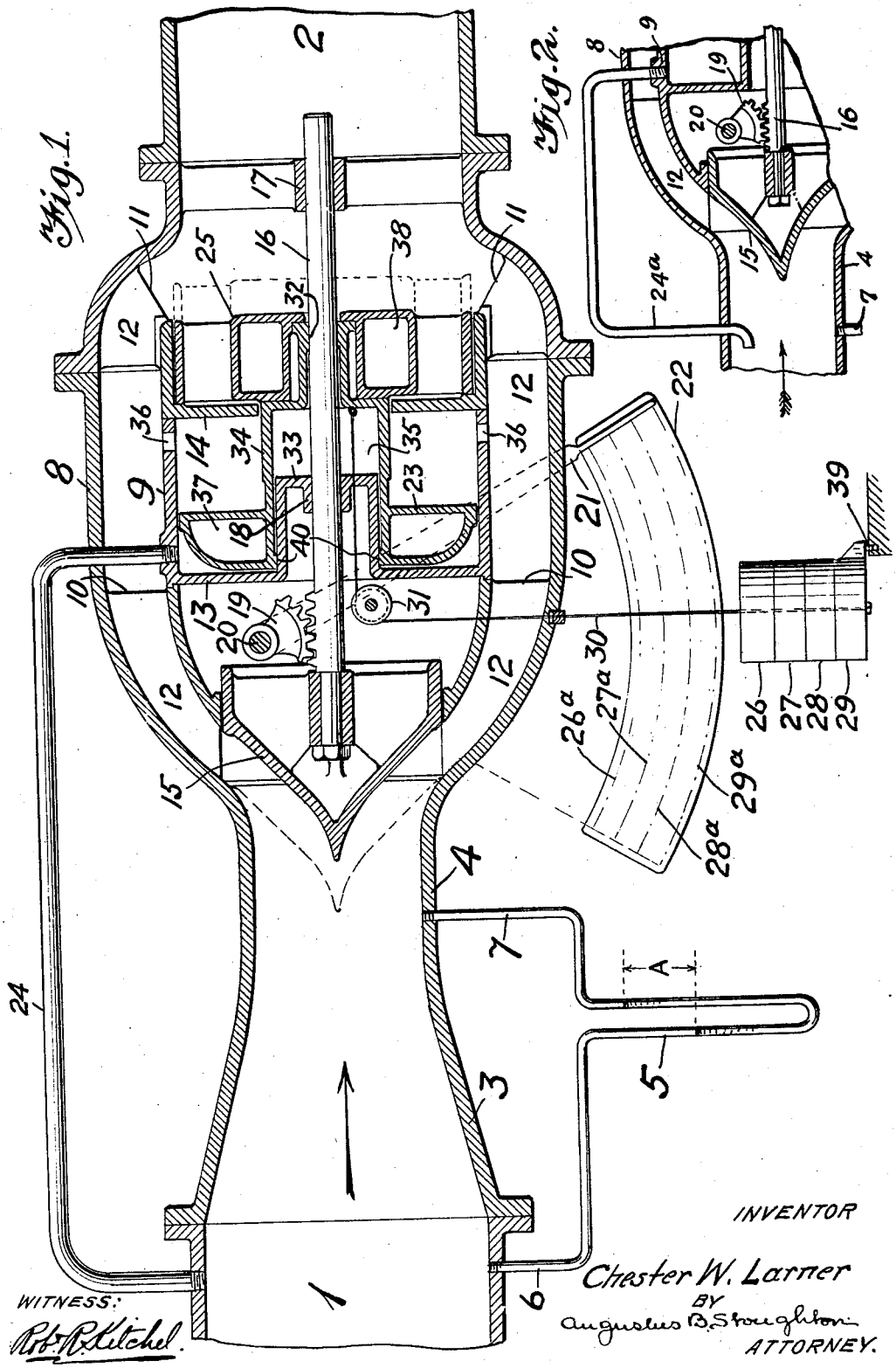
INVENTOR
Chester W. Larner
BY
Augustus B. Stoughton
ATTORNEY.
WITNESS:
Rob. R. Kitchel.

Patented Nov. 11, 1924.

1,514,975

UNITED STATES PATENT OFFICE.

CHESTER W. LARNER, OF PHILADELPHIA, PENNSYLVANIA.

RATE OR FLOW CONTROLLER.

Application filed November 28, 1921. Serial No. 518,292.

*To all whom it may concern:*

Be it known that I, CHESTER W. LARNER, a citizen of the United States, residing at Philadelphia, in the county of Philadelphia and State of Pennsylvania, have invented a new and useful Improvement in Rate or Flow Controllers, of which the following is a specification.

The invention comprises improvements in devices for regulating and maintaining constant flow in a pipe line, and such devices are ordinarily known as flow controllers or rate controllers. The device of the present invention is suitable for any purpose requiring constant flow of a fluid, but its most common employment is in connection with filtration plants to regulate the flow of water drawn from a filter bed. In this service it is desirable to draw off the filtered water at an approximately constant rate, but as the filter becomes foul the head acting on the regulating device drops off and hence such a device must be capable of compensating for this decrease of operating head and this a device embodying the present invention is capable of doing with precision and accuracy.

A device of the present invention comprises, in addition to the flow controller or regulating elements or features a Venturi tube for measuring and indicating the flow through the controller, and it is so designed as to close tightly and prevent leakage, thus acting as a stop valve also.

In addition a device of the invention is very compact and affords a path for the water which is easy and efficient and not tortuous.

The invention further comprises the improvements to be presently described and finally claimed and in the description reference will be made to the accompanying drawings forming part hereof and showing in Figure 1 a vertical central section of rate or flow controller embodying the invention in one, but not the only one, of its forms, and in Fig. 2 a view drawn to a reduced scale of a portion of the apparatus shown in Figure 1 illustrating a modification.

Referring to the drawings, 1 is the conduit or pipe line leading to the controller and 2 is the conduit or pipe line leading away from the controller. These pipes are usually, but not necessarily, the same size. 3 is a contracting pipe leading to a straight section 4 of reduced diameter which forms the throat of a Venturi tube equipped with the usual U-tube 5 for measuring the velocity of flow in the pipe 1. The U-tube is filled with mercury in the customary way or with water, having air in the connections 6 and 7 so that the difference of level A of mercury or water, as the case may be, indicates the flow through the Venturi tube. The contracted section 4 expands in the direction of flow into a body 8 of circular cross section containing an internal cylinder 9 supported from the body by radial ribs 10 and 11 forming a waterway 12 of generally annular cross-section.

The internal cylinder 9 is provided with fixed partitions 13 and 14 and there is a movable plunger 15 at the upstream end which in co-operation with the body 8 forms an orifice, the area of which may be varied by the movement of plunger 15. Plunger 15 is connected to a rod 16 guided in bearings 17 and 18 and movable in an axial direction by means of a gear segment 19 which engages a rack on rod 16. Gear segment 19 is operated by a rotating shaft 20 passing through the body 8 and operated by any suitable mechanism such as lever 21 on the outside of body 8. Lever 21 serves as a means of operation and also as an indicator to show the position of the plunger 15, an indicator board 22 being provided with suitable scale or scales for this purpose. The plunger 15 may be held at any desired position by locking the operating gear by any of the ordinary methods too familiar in the art to require illustration or description.

A piston 23 operates in the chamber formed between partitions 13 and 14. One side of the piston is subjected to the pressure of pipe 1 by means of pipe 24. An alternative location of that pipe is shown in Figure 2 at 24$^a$. This connection passes through the wall of the contracted section 4 and is turned upstream in order to secure the effect of the velocity as well as the static pressure. The pressure communicated to the piston 23 by 24 or 24$^a$ is practically the same, the only difference being that due to the slight friction loss between the two points of connection to pipes 1 and 4.

The other side of piston 23 is subjected to the pressure of the annular passage 12 by means of openings 36. Piston 23 is connected to or provided with a cylindrical sleeve valve 25 which travels in an axial direction (as indicated by the dotted lines) and serves to throttle the flow passing from passage 12 to the discharge pipe 2.

The movement of piston 23 which tends to throttle the discharge from passage 12 is opposed by weights 26, 27, 28 and 29 located in some convenient position outside of body 8 and connected to the structure of piston 23 by means of a cable 30 passing through body 8, internal cylinder 9 and partition 13 and over pulley 31. In order that sleeve valve 25 may be operated in the manner hereafter described with a high degree of precision, it is necessary that it and piston 23' to which it is connected should slide axially on rod 16, which serves as a guide, with the least possible friction. In order to accomplish this, the clearances between the moving structure and internal cylinder 9 are made sufficiently great to eliminate all friction. The only close fits provided are at 40 and 32, these fits serving as accurate guides. Partition 13 has an extension 33 which telescopes the cylindrical connection 34, thus forming a dash-pot to prevent unsteady or erratic movement of piston 23. When piston 23 moves it is obvious that fluid must be drawn into or expelled from chamber 35 through the clearances at 40 and 32 and since these clearances are relatively small, the motion of piston 23 will be controlled.

The controller is so designed that the orifice regulated by plunger 15 is preferably although not necessarily of smaller cross sectional area normal to the direction of flow than any other part of the water passage between pipes 1 and 2. It is therefore obvious that this orifice is analogous to a nozzle and the flow through it will be controlled by the cross sectional area of the opening, the head upstream from the orifice and the head downstream from the orifice. The difference between the latter two heads is, of course, the effective head acting upon the orifice and producing flow through it. The velocity through the orifice is dependent upon the difference between the head or pressure upstream and the head or pressure downstream.

It is obvious therefore that for any given setting of plunger 15 the flow will be constant if the effective head remains constant. The function of plunger 15 is to vary the cross-sectional area of the control orifice according to the amount of flow required and the function of sleeve valve 25 is to automatically control the pressure in passage 12 so that the effective head on the regulating orifice is maintained constant regardless of fluctuations of pressure in pipe 1.

Inasmuch as one side or face of piston 23 is at all times subjected to the pressure of pipe 1 and the other side or face is at all times subjected to the pressure of passage 12, it follows that piston 23 and valve 25 will move and continue to move downstream until the difference between the forces exerted on piston 23 is balanced by the weight suspended on cable 30. Furthermore, since, as already explained, the difference between the two pressures at all times exerted on piston 23 is the effective head acting upon the regulating orifice at plunger 15, it follows that, assuming a constant weight on cable 30, valve 25 will always move until it produces a constant effective head on the regulating orifice, no matter what fluctuations of head occur in pipe 1. This result is accomplished principally by the building up of pressure on the downstream side of piston 23, the pressure on the upstream side changing very little, if at all, as a result of the movement of valve 25. As valve 25 moves downstream it is obvious that the pressure in passage 12 which is communicated to the piston 23 through openings 36 rises until it balances the effect of the pressure on the other side of the piston and the weight suspended on cable 30. Thus valve 25 automatically adjusts itself to produce a constant effective head on the regulating orifice, this head depending upon the amount of weight suspended on cable 30.

In order to increase the precision of action of valve 25, hollow chambers 37 and 38 may be provided and so designed and located as to produce a buoyant effect equal to the weight of the structure. In this way friction may be practically eliminated. If, however, the controller is placed with the axis vertical and flow upward the weight of piston 23 and valve 25 may be so adjusted as to dispense with the necessity of the weight suspended on cable 30.

The operation of the controller may be well described by considering its application to an actual installation such as a filter bed in which the variation of head is, for example, from 10 feet maximum to 2 feet minimum.

If it is desired to regulate the flow over the full range of head without changing the weights, or, in other words, to have a fixed setting of plunger 15 pass the same quantity of water under 2 feet head as under 10 feet head it is obvious that the weight on cable 30 must be designed to balance piston 23 when the differential pressure acting on the piston is 2 feet of head. This means that when the head in pipe 1 is 10 feet, valve 25 will close automatically until the head in passage 12 is 8 feet thus producing an effective head on the regulating orifice of 2 feet.

The disadvantage of this method of operation consists in the fact that the controller must be made large enough to discharge the maximum quantity of water required under the minimum head and no advantage is taken of the fact that during a large part of the time the head is high enough to pass a much larger quantity of water.

The latter consideration, however, is provided for by varying the weight suspended on cable 30. Starting in then with a head of 10 feet in pipe 1 and, assuming the use of four different weights dividing the range from 10 feet down to 2 feet into four stages of 2 feet each, the weight suspended on cable 30 would be sufficient to balance a differential pressure of 8 feet on piston 23. Such a weight, for example, is represented by weights 26, 27, 28 and 29. These weights produce an effective head on the regulating orifice of 8 feet and the scale 26ª on board 22 is then marked with the discharge corresponding to different positions of plunger 15, the discharge being measured by means of the U-tube 5. It then follows that regardless of whether or not the head in pipe 1 is 10 feet the discharge through the regulating orifice will always correspond to the markings on the scale 26ª, provided all of the weights 26, 27, 28 and 29 are in use.

In the case under consideration as the filter becomes more or less foul, the head in pipe 1 will gradually fall below 10 feet. The effect of this drop of pressure acting upon piston 23 will be to open valve 25 more and more until it reaches the wide open position when, of course, it no longer affects the pressure in passage 12. Any further drop of pressure in pipe 1 will have no effect upon valve 25 because it cannot move any further. It is necessary at this point to reduce the weight on cable 30 or the controller will no longer function. A convenient means of attracting the attention of the operator to this condition necessitating the removal of weight 26 consists in the use of a push button 39 or other signal device so located as to become operative when weight 29 is in its lowest position corresponding to the open position of valve 25.

After weight 26 has been removed, the remaining weights will be sufficient to balance a differential pressure on piston 23 of 6 feet and the flow corresponding to various positions of plunger 15 is determined by means of U-tube 5 and marked on scale 27ª. The controller is again operated with weights 27, 28 and 29 until the head has fallen sufficiently to open valve 25 wide and to affect the signal device 39. At this point weight 27 should be removed and the regulator should be set according to scale 28ª which has been calibrated by means of U-tube 5 in the manner already described.

The controller is then operated with weights 28 and 29 until the valve 25 is again brought to the wide open position when weight 28 should be removed and the controller is then operated with weight 29 alone, the setting of plunger 15 being according to scale 29ª which has been calibrated with weight 29 alone.

The arrangement of the flow controller is favorable to hydraulic efficiency and economical in size and cost of parts. The water passages are of ample area and smoothly curved without abrupt changes of cross-section. This is largely due to the fact that the axis of flow through the controller is a straight line and coincides with the axis of the pipe in which the controller is installed so that there is no change in the principal direction of the flow. When the controller is combined with the Venturi tube, the utilization of the controller as the expanding leg of the Venturi tube results in the plunger 15 seating at the throat of the tube, which is the smallest part of the tube, and consequently the size of the controller parts is reduced to a minimum. Moreover, the location of the controller downstream from the throat of the Venturi tube permits the seating of the plunger 15 at the throat and at the same time does not interfere with the accurate reading of the U-tube 5 as would be the case if the controller were located in the contracting pipe 3 with the plunger 15 pointing downstream and seating at 4.

It will be obvious to those skilled in the art to which the invention relates that modifications may be made in details of construction and arrangement without departing from the spirit of the invention which is not limited as to such matters or otherwise than as the state of the prior art and the appended claims may require.

I claim:

1. A rate or flow controller comprising the combination of a Venturi tube the diverging portion of which provides a casing for the controller, an orifice structure having provisions for manually adjusting the cross-sectional area of the orifice, and a piston valve structure having a fixed urge toward the open valve position and subjected to the pressure on each side of the orifice and movable in respect to closing position in opposition to the fixed urge by the difference in pressure on opposite sides of the orifice to build up downstream pressure and keep the effective head on the orifice constant notwithstanding variations in pressure on the upstream side of the orifice.

2. A rate or flow controller comprising the combination of a Venturi tube the diverging portion of which provides a casing for the controller, an orifice structure, and a piston valve structure having a fixed urge toward the open valve position and subjected to the pressure on each side of the orifice and movable in respect to closing position in opposition to the fixed urge by the difference in pressure on opposite sides of the orifice to build up downstream pressure and keep the effective head on the orifice constant notwithstanding variations in pressure on the upstream side of the orifice.

3. A rate or flow controller having in combination a manually controlled regulating orifice element and an automatically controlled element which regulates the effective head on the manually controlled element, said elements being in coaxial relation with the waterway.

4. A rate or flow controller comprising the combination of an orifice structure, a piston valve structure having a fixed urge toward the open valve position and subjected to the pressure on each side of the orifice and movable in respect to closing position in opposition to the fixed urge by the difference in pressure on opposite sides of the orifice to build up downstream pressure and keep the effective head on the orifice constant notwithstanding variations in pressure on the upstream side of the orifice, and means for increasing or diminishing the urge on the valve, the orifice structure and the piston valve structure being in coaxial relation with the water way.

5. A rate or flow controller including in combination a body, an internal cylinder structure having a valve piston chamber and a dash pot chamber, a waterway provided between the body and the internal cylinder structure, a plunger constituting with the entrance of the body an annular orifice of adjustable cross-sectional area and having a stem guided by the cylinder structure, manual means for shifting and positioning the plunger, a valve piston in the valve piston chamber and in the dash pot and provided with a valve effective to build up back pressure in the fluid-way, connections for subjecting the valve piston to the upstream pressure and to the back pressure established by the valve, and a weight constituting a fixed urge on the valve toward open position.

6. A rate or flow controller including in combination a Venturi tube of which the diverging portion provides a body, a cylinder structure arranged in the body with a fluid-way between, a pointed plunger for establishing in connection with the wall of the body an annular orifice and a valve closure, manual means for operating the plunger and for positioning it, a piston valve effective near the outlet of the body, means for subjecting the piston valve to the upstream pressure and to the back pressure built up in the fluid-way by the valve, and a weight constituting a constant urge on the valve, substantially as described.

7. The combination in a rate or flow controller of a body, a cylinder structure, a fluid way provided between the body and structure, a plunger having a spindle guided by the cylinder structure, a valve piston guided on the spindle and on the cylinder structure and having float chambers to minimize friction, connections for subjecting the valve piston to upstream pressure and to back pressure built up in the fluid-way, and a weight urging the valve piston into open valve position.

8. The combination in a rate or flow controller of an orifice structure of smaller effective cross-sectional area than any other part of the water passage provided through the controller, a piston valve operative on the downstream side of the orifice for maintaining the effective head on the orifice constant regardless of fluctuations of upstream pressure, connections for subjecting the respective faces of the piston to upstream pressure and to the valve controlled downstream pressure so that the valve will continue to move downstream until the difference between the forces exerted on the piston is balanced, and means applied to the valve for balancing a predetermined difference between said forces, substantially as described, said structure and piston valve being in coaxial relation with the water way.

9. A rate or flow controller comprising the combination of an orifice structure having provisions for manually adjusting the cross-sectional area of the orifice, and a piston valve structure having a fixed urge toward the open valve position and subjected to the pressure on each side of the orifice and movable in respect to closing position in opposition to the fixed urge by the difference in pressure on opposite sides of the orifice to build up downstream pressure and keep the effective head on the orifice constant notwithstanding variations in pressure on the upstream side of the orifice, said structure and valve being in coaxial relation with the water way.

10. A rate or flow controller comprising the combination of a Venturi tube the diverging portion of which provides a casing for the controller, an orifice structure having provisions for manually adjusting the cross-sectional area of the orifice, and a piston valve structure having a fixed urge toward the open valve position and subjected to the pressure on each side of the orifice and movable in respect to closing position in oposition to the fixed urge by the difference in pressure on opposite sides of the orifice to build up downstream pressure and keep the effective head on the orifice constant notwithstanding variations in pressure on the upstream side of the orifice, said structure and valve being in coaxial relation with the water way.

CHESTER W. LARNER.